(12) United States Patent
Cho

(10) Patent No.: US 8,782,789 B2
(45) Date of Patent: Jul. 15, 2014

(54) SYSTEM AND METHOD FOR DETECTING ADDRESS RESOLUTION PROTOCOL (ARP) SPOOFING

(71) Applicant: Samsung SDS Co., Ltd., Seoul (KR)

(72) Inventor: Seong-Myun Cho, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/660,485

(22) Filed: Oct. 25, 2012

(65) Prior Publication Data

US 2013/0111589 A1    May 2, 2013

(30) Foreign Application Priority Data

Oct. 28, 2011 (KR) .................. 10-2011-0111562

(51) Int. Cl.
*G06F 11/00* (2006.01)

(52) U.S. Cl.
USPC ............... 726/23; 726/13; 709/218; 709/222; 709/245

(58) Field of Classification Search
USPC ........ 726/13, 22–23; 709/217, 245, 213, 222, 709/218
See application file for complete search history.

(56) References Cited

U.S. PATENT DOCUMENTS 7,234,163 B1 *   6/2007   Rayes et al. .................... 726/22
7,490,351 B1 *   2/2009   Caves et al. ..................... 726/13

FOREIGN PATENT DOCUMENTS

KR   10-2007-0093257 A   9/2007
KR   10-0807933 B1        3/2008

OTHER PUBLICATIONS

Mohammed, L.A.; et al,; "DoS attacks and defense mechanisms in wireless networks"; Mobile Technology, Applications and Systems, 2005 2nd International Conference on Digital Object Identifier: 10.1109/MTAS.2005.207176; Publication Year: 2005 , pp. 8.*
Dai Zovi, D.A.;et al.; "Attacking automatic wireless network selection"; Information Assurance Workshop, 2005. IAW '05; Proceedings from the Sixth Annual IEEE SMC Digital Object Identifier: 10.1109/IAW.2005.1495975; Publication Year: 2005 , pp. 365-372.*
Communication, dated Dec. 5, 2012, issued by the Korean Intellectual Property Office in counterpart Korean Patent Application No. 10-2011-0111562.

* cited by examiner

*Primary Examiner* — Hadi Armouche
*Assistant Examiner* — Angela Holmes
(74) *Attorney, Agent, or Firm* — Sughrue Mion, PLLC

(57) ABSTRACT

There are provided a system and method for detecting Address Resolution Protocol (ARP) attacks. The ARP spoofing attack detection system includes: a reception module which receives an ARP packet, and which determines whether the received ARP packet is an unsolicited ARP packet; a transmission module which creates, if the ARP packet is an unsolicited ARP packet, an ARP request packet corresponding to the unsolicited ARP packet, and which broadcasts the ARP request packet; and a detection module which determines, if an ARP response packet corresponding to the ARP request packet is received, whether an input port of the ARP response packet is identical to an input port of the unsolicited ARP packet, and which determines that an ARP spoofing attack has occurred if the input port of the ARP response packet is not identical to the input port of the unsolicited ARP packet.

14 Claims, 6 Drawing Sheets

SYSTEM AND METHOD FOR DETECTING ADDRESS RESOLUTION PROTOCOL (ARP) SPOOFING

CROSS-REFERENCE TO RELATED APPLICATION

This application claims priority from Korean Patent Application No. 10-2011-0111562, filed on Oct. 28, 2011, the disclosure of which is incorporated herein by reference in its entirety.

BACKGROUND

1. Field

Exemplary embodiments relate to a technique for detecting external attacks relating to Address Resolution Protocol (ARP) spoofing by using the vulnerabilities of ARP.

2. Discussion of Related Art

Recently, incidents in which overseas attackers hack domestic websites and insert malicious codes into the domestic websites have been frequently occurring. In the case of such hacking, generally, web servers are hacked, and then malicious codes are inserted by using the hacked web servers. However, recently, cases in which malicious codes and other destructive forms of information are downloaded from a web server which has not been hacked have been occurring. The cases are generated when a sniffer hacks another server which resides in the same Internet Protocol (IP) segment to which a target web server belongs, intercepts web traffic related to the target web server by using Address Resolution Protocol (ARP) spoofing, and inserts malicious codes into the web traffic.

ARP spoofing attacks are used by sniffers to disguise their Media Access Control (MAC) address as a MAC address of another computer that is used in a local area network (LAN) by exploiting the vulnerabilities of ARP. ARP spoofing attacks are also referred to as ARP cache poisoning attacks, because they arbitrarily change ARP cache information.

By using ARP spoofing attacks, a sniffer can disguise a MAC address as a MAC address of a router or as a MAC address of a target server in order to easily intercept packets. However, recently, ARP spoofing attacks have become more problematic, because they have evolved into attacks which involve intercepting packets, modifying the packets, and then re-transmitting the modified packets. Accordingly, technology for easily detecting ARP spoofing attacks by using a switch, or by using other types of equipment which are commonly used, and blocking the ARP spoofing attacks is needed.

SUMMARY

Exemplary embodiments are directed to a system which is capable of easily detecting Address Resolution Protocol (ARP) spoofing attacks and blocking the detected ARP spoofing attacks in advance as necessary.

According to an aspect of one or more exemplary embodiments, there is provided an Address Resolution Protocol (ARP) spoofing attack detection system including: a receiver which receives a first ARP packet, and which determines whether the received first ARP packet is an unsolicited ARP packet; a transmitter which creates, if the received first ARP packet is determined as an unsolicited ARP packet, an ARP request packet which corresponds to the unsolicited ARP packet, and which broadcasts the created ARP request packet; and a detector which determines, if an ARP response packet which corresponds to the broadcasted ARP request packet is received, whether an input port of the received ARP response packet is identical to an input port of the unsolicited ARP packet, and which determines that an ARP spoofing attack has occurred if the input port of the received ARP response packet is not identical to the input port of the unsolicited ARP packet.

According to another aspect of one or more exemplary embodiments, there is provided an Address Resolution Protocol (ARP) spoofing attack detection method which is performable by using an ARP spoofing attack detection system, including: receiving a first ARP packet, and determining whether the received first ARP packet is an unsolicited ARP packet; creating, if the received first ARP packet is determined as an unsolicited ARP packet, an ARP request packet which corresponds to the unsolicited ARP packet, and broadcasting the created ARP request packet; receiving an ARP response packet which corresponds to the broadcasted ARP request packet; and determining whether an input port of the received ARP response packet is identical to an input port of the unsolicited ARP packet, and determining that an ARP spoofing attack has occurred if the input port of the ARP response packet is determined as not identical to the input port of the unsolicited ARP packet.

Therefore, according to the exemplary embodiments, it is possible to easily detect ARP spoofing attacks at a switch terminal due to the vulnerabilities of the ARP attacks, and to block such ARP spoofing attacks in advance as necessary.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments will be described in detail below with reference to the accompanying drawings. While the present disclosure is shown and described in connection with exemplary embodiments thereof, it will be apparent to those skilled in the art that various modifications can be made without departing from the spirit and scope of the present disclosure.

Figure 1:
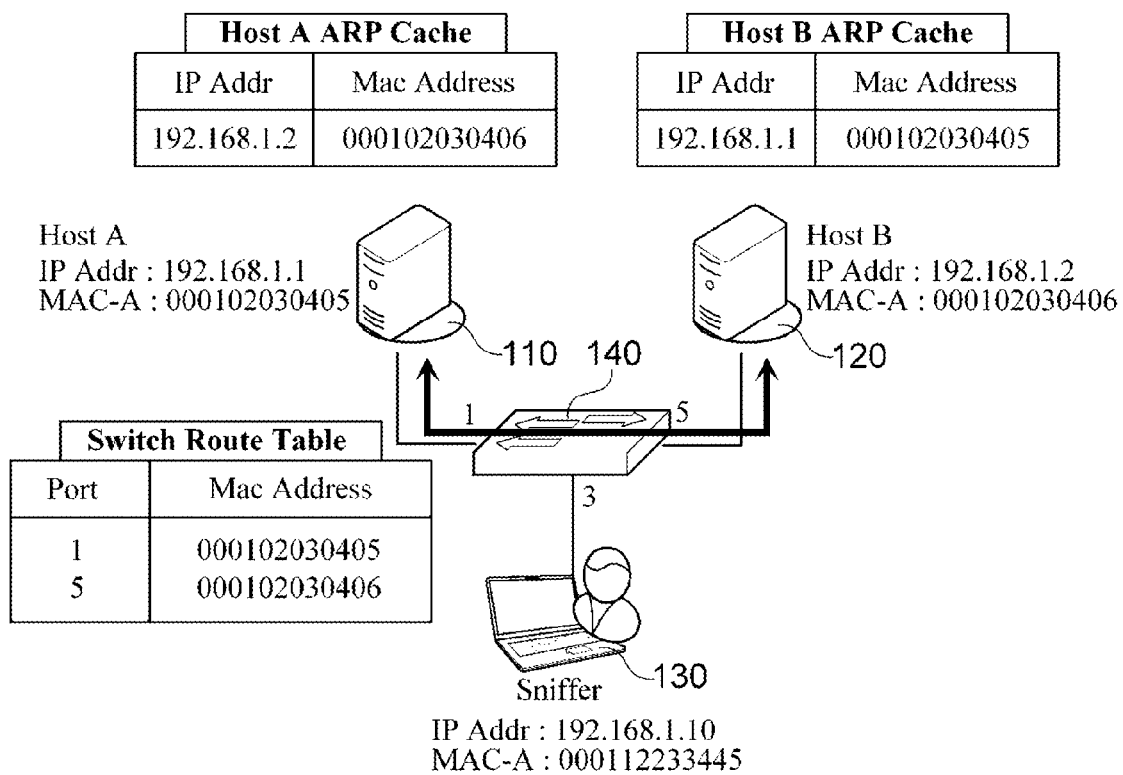
FIGS. 1 and 2 are views which illustrate an Address Resolution Protocol (ARP) spoofing attack.
Figure 2:
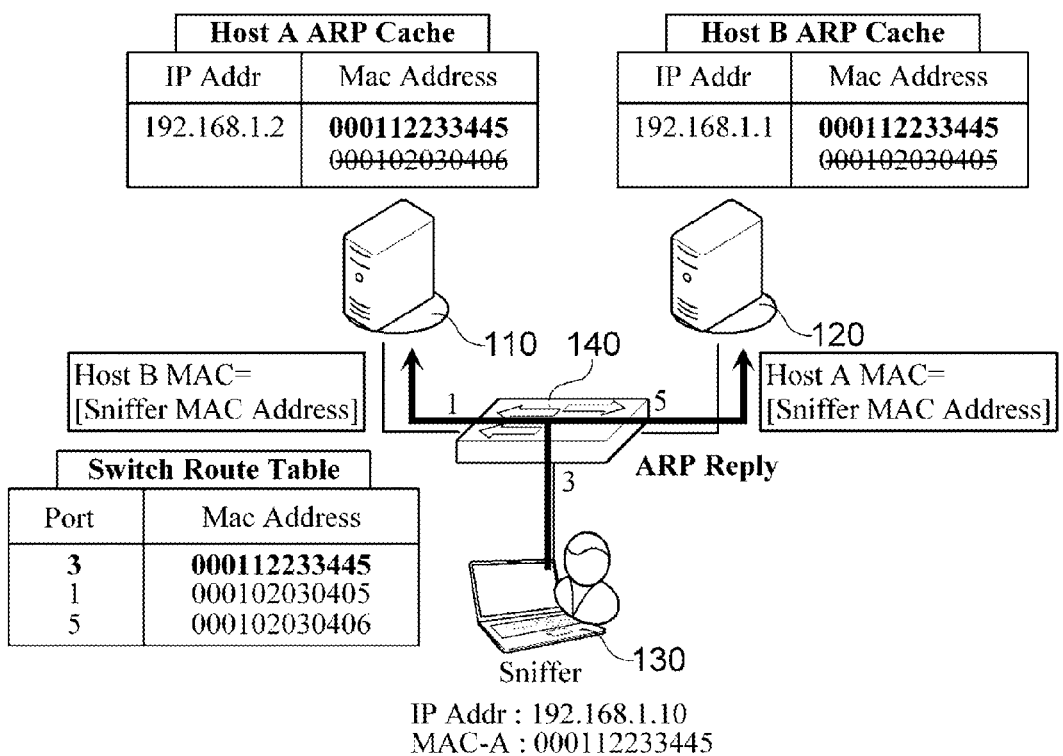

FIGS. 1 and 2 are views which illustrate an aspect of a general Address Resolution Protocol (ARP) spoofing attack. In particular, FIG. 1 is a view which illustrates a state in which no ARP spoofing attack is generated, and FIG. 2 is a view which illustrates a state which may exist after an ARP spoofing attack is generated.

As shown in FIG. 1, a host A 110 (IP address: 192.168.1.1, MAC address: 000102030405) and a host B 120 (IP address: 192.168.1.2, MAC address: 000102030406) are connected to each other via a L2 switch 140 in order to receive/transmit packets from/to each other. In this case, an ARP cache table of host A 110 stores the IP address and MAC address of host B 120 which is another host in the same network, and an ARP cache table of host B 120 stores the IP address and MAC address of host A 110. Further, a route table of the L2 switch 140 stores the MAC addresses of hosts A and B 110 and 120 in conjunction with respective port numbers for each of hosts A and B 110 and 120 for packet routing to hosts A and B 110 and 120.

In the state illustrated in FIG. 1, a sniffer 130 (IP address: 192.168.1.10, MAC address: 000112233445) sends an ARP response message which includes its MAC address to each of hosts A and B (110 and 120) for ARP spoofing. The ARP response message is created without a previous ARP request, so it is called an unsolicited (or gratuitous) ARP packet. For example, the sniffer may create a new ARP response message by including the IP address of host B 120 as the sender's IP address of the ARP response message, adding the sniffer's own MAC address to the sender's MAC address of the ARP response message, and then sending the resultant ARP response message to host A 110. Similarly, the sniffer 130 may include the IP address of host A 110 as the sender's IP address of a newly created ARP response message, add the sniffer's own MAC address to the sender's MAC address of the ARP response message, and then send the resultant ARP response message to host B 120.

Due to the characteristics of ARP, each respective host in a network is configured to update its own ARP cache table when receiving an ARP response message, although the respective host may or may not have transmitted an ARP request message. Accordingly, in the examples described above, hosts A and B 110 and 120 update their respective ARP cache tables with the sniffer's MAC address based on the received ARP response messages, as shown in FIG. 2. In particular, upon receipt of the respective spoofed ARP response messages from the sniffer 130, host A 110 changes host B's MAC address to the sniffer's MAC address, and stores the sniffer's MAC address in its ARP cache table; and host B 120 changes host A's MAC address to the sniffer's MAC address, and stores the sniffer's MAC address in its ARP cache table. Thereafter, all traffic generated between hosts A and B 110 and 120 is routed to the sniffer 130 via the L2 switch 140. Accordingly, the sniffer 130 can intercept and modulate packets transmitted between hosts A and B 110 and 120 by exploiting the vulnerabilities of the ARP.

Figure 3:
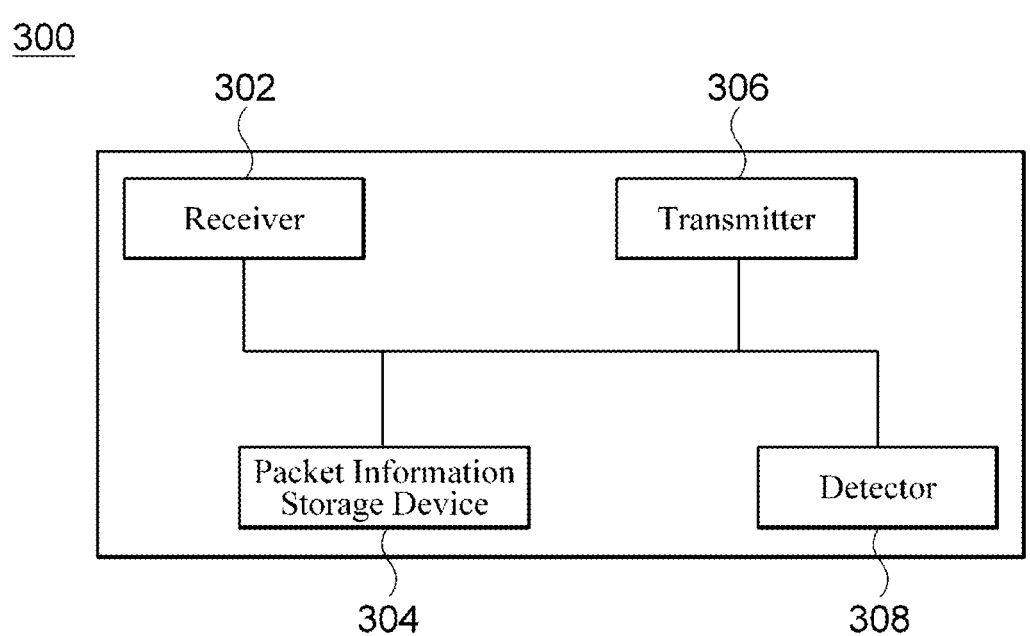
FIG. 3 is a block diagram which illustrates an ARP spoofing attack detection system according to an exemplary embodiment.

FIG. 3 is a block diagram which illustrates an ARP spoofing attack detection system 300 according to an exemplary embodiment. As shown in FIG. 3, the ARP spoofing attack detection system 300 includes a receiver 302, a packet information storage device 304, a transmitter 306, and a detector 308. The ARP spoofing attack detection system 300 may be included as a component of a L2 switch, or implemented as a separate system which is connected to a L2 switch in order to exchange data with the L2 switch. In particular, the ARP spoofing attack detection system 300 may be implemented in conjunction with a L2 switch for relaying packets between hosts in a network, in order to thereby monitor ARP packets transmitted between the hosts, detect any ARP spoofing attack packets in real time, and block such ARP spoofing attack packets.

The receiver 302 receives an ARP packet from another component (for example, a host) on a network, and determines whether the received ARP packet is an unsolicited ARP packet. In the present specification, an unsolicited (or gratuitous) ARP packet refers to an ARP response packet which has been transmitted in the absence of a previous transmission of a corresponding ARP request packet. Generally, an unsolicited ARP packet refers to a packet which has been transmitted on a network in order to update an ARP cache or to check duplication of an IP address. However, such an unsolicited ARP packet which is generally used to update an ARP cache or prevent the duplication of an IP address can also be maliciously used for ARP spoofing attacks as described above with reference to FIGS. 1 and 2. Accordingly, the receiver 302 determines whether a received packet is an unsolicited ARP packet in order to detect ARP spoofing attacks.

The receiver 302 determines whether the received packet is an unsolicited ARP packet, by performing the following process. First, if an ARP packet is received, the receiver 302 checks a type, or a kind, of the received ARP packet. In particular, the receiver 302 determines whether the received ARP packet is an ARP request packet or an ARP response packet. The type, or kind, of the ARP packet is checked by determining the content of the operation field of the ARP packet header. In particular, if the operation field of the ARP packet header stores a value of "1", the ARP packet is determined as an ARP request packet, and if the operation field of the ARP packet header stores a value of "2", the ARP packet is determined as an ARP response packet.

If the received ARP packet is determined as an ARP response packet, the receiver 302 determines whether an ARP pending entry which corresponds to the ARP response packet exists in an ARP transaction table. If no ARP pending entry which corresponds to the ARP response packet is found in the ARP transaction table, the receiver 302 determines that the received ARP packet is an unsolicited ARP packet.

The ARP transaction table is a data storage entity that may be used to trace ARP transactions. If a specific host in the network transmits an ARP request packet, the packet information storage device 304, which is described below, creates an ARP pending entry which corresponds to the transmitted ARP request packet in the ARP transaction table, and if an ARP response packet is received from another host in the network, which host has received the transmitted ARP request packet, the packet information storage device 304 deletes the corresponding ARP pending entry from the ARP transaction table. In particular, the ARP transaction table entry is created when an ARP request is issued, and deleted when an ARP response which corresponds to the issued ARP request is received. The ARP transaction table is used to check which ARP requests are waiting to be answered. If no ARP pending entry which corresponds to a received ARP response packet is found in the ARP transaction table, this indicates that no host has requested the corresponding ARP response, and accordingly, the corresponding ARP response packet is determined as an unsolicited ARP packet.

The packet information storage device 304 is used to manage the ARP transaction table as described above. If an ARP packet which is received via the receiver 302 is determined as an ARP request packet, the packet information storage device 304 creates an ARP pending entry which corresponds to the received ARP packet and includes the created ARP pending entry in the ARP transaction table. The created ARP pending entry may include information an ARP request packet sender's IP/MAC address and an IP address of a receiving party.

Further, if the ARP packet received by the receiver 302 is an unsolicited ARP packet, the packet information storage device 304 creates an ARP pending entry which corresponds to the unsolicited ARP packet and includes the created ARP pending entry in the ARP transaction table. In addition, in this case, the packet information storage device 304 adds unsolicited ARP packet information (i.e., information relating to a host that has transmitted the unsolicited ARP packet) which includes information relating to an input port of the unsolicited ARP packet to the created ARP pending entry, and stores the resultant ARP pending entry. The information is used by the detector 308, which is described below, in order to determine whether the unsolicited ARP packet is an ARP spoofing attack packet.

If the ARP packet received by the receiver 302 is determined as an unsolicited ARP packet, the transmitter 306 creates an ARP request packet for requesting a MAC address which corresponds to an IP address of a sender of the unsolicited ARP packet, and broadcasts the created ARP request packet. The broadcasting of the ARP request packet is performed for a purpose of determining whether the unsolicited ARP packet is an ARP spoofing attack packet or a normal packet. Accordingly, a host that corresponds to a reception IP address, which is identical to the transmission IP address of the unsolicited ARP packet, of the broadcasted ARP request packet creates an ARP response packet in response to the broadcasted ARP request packet, and transmits the created ARP response packet. The transmitted ARP response packet is received by the ARP spoofing attack detection system 300.

If the ARP response packet is received in response to the ARP request packet broadcasted by the transmitter 306, the detector 308 determines whether or not an input port of the received ARP response packet is identical to the input port of the unsolicited ARP packet which is stored in the corresponding ARP pending entry, and determines that an ARP spoofing attack has occurred if the input port of the received ARP response packet is not identical to the input port of the unsolicited ARP packet which is stored in the ARP pending entry. If the unsolicited ARP packet is a normal packet (i.e., a packet which has been transmitted from a host having the corresponding IP address), the input port of the unsolicited ARP packet is identical to the input port of the corresponding ARP response packet. However, if the unsolicited ARP packet has been transmitted from a sniffer, and not from a normal host, the input port of the unsolicited ARP packet will not be identical to the input port of the corresponding ARP response packet (i.e., because the unsolicited ARP packet has been transmitted from a sniffer and the corresponding ARP response packet has been transmitted from a normal host, the transmission paths of the two packets are different from each other), and therefore, the detector 308 can detect an ARP spoofing attack by determining whether or not the input ports of the unsolicited ARP packet and the corresponding ARP response packet are identical to each other.

The comparison described above, which is performed by the detector 308, is performed only when information relating to the unsolicited ARP packet has been added to an ARP pending entry which corresponds to the received ARP response packet and is included in the ARP transaction table. If an ARP pending entry which corresponds to the received ARP response packet exists in the ARP transaction table but no unsolicited ARP packet information has been added to the ARP pending entry, it is determined that the ARP pending entry has been created by a normal ARP request packet, and in this case, the detector 308 deletes the ARP pending entry which corresponds to the received ARP response packet from the ARP transaction table, and transmits the corresponding ARP packet to a destination.

Figure 4A:
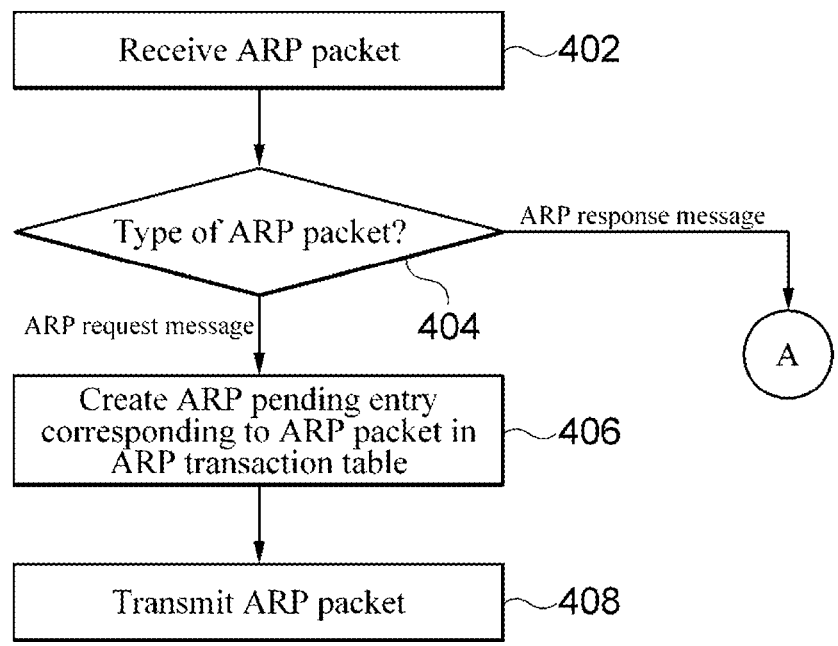
FIGS. 4A, 4B, and 4C collectively form a flowchart which illustrates an ARP spoofing attack detection method according to an exemplary embodiment.
Figure 4B:
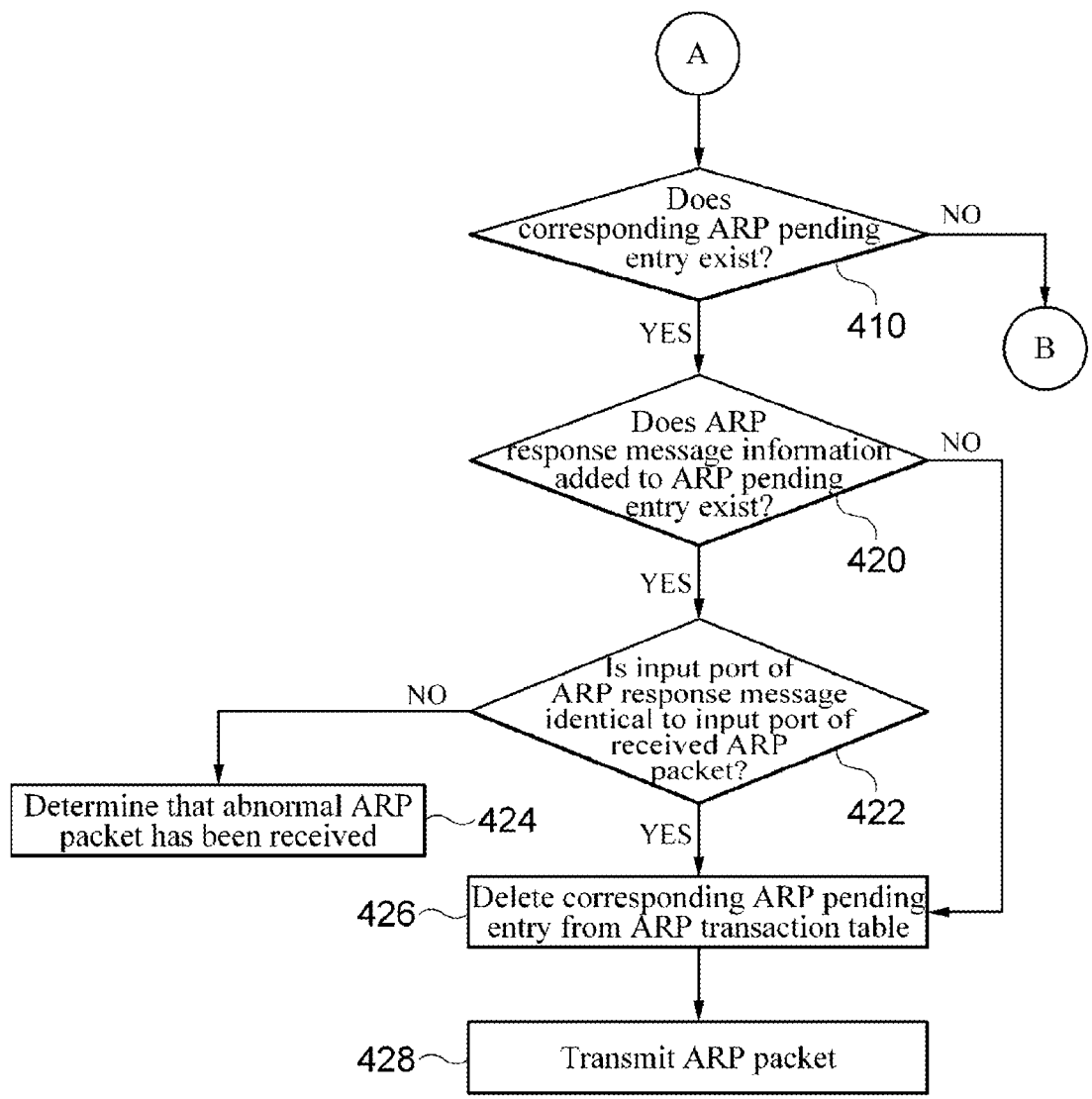
Figure 4C:
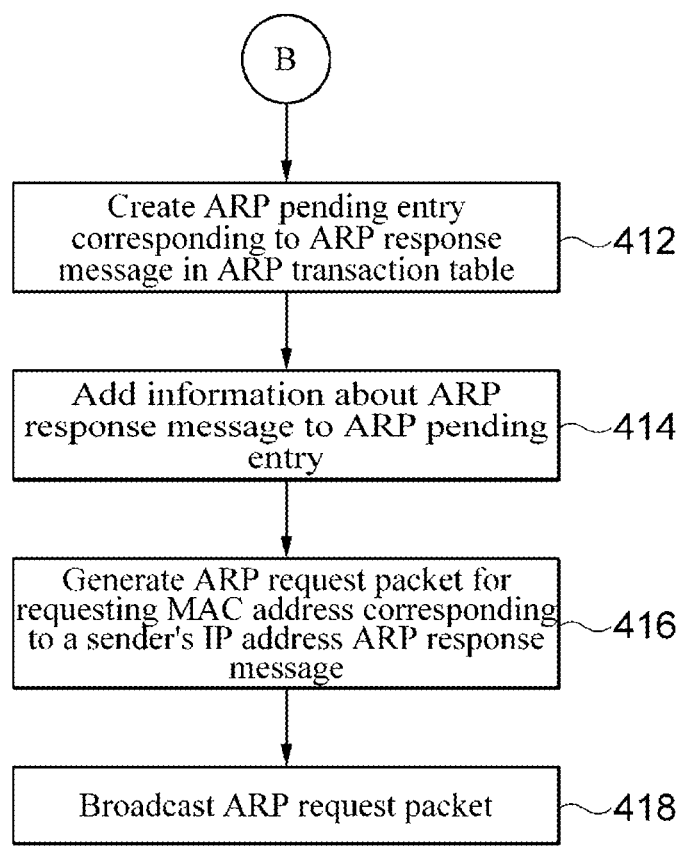

FIGS. 4A, 4B, and 4C collectively form a flowchart which illustrates an ARP spoofing attack detection method 400 according to an exemplary embodiment, which method is performable by using the ARP spoofing attack detection system 300.

Referring to FIGS. 3, 4A, 4B, and 4C, in operation 402, an ARP packet is received, and a determination as to whether the ARP packet is an unsolicited ARP packet is made. In particular, in operation 404, the type, or kind, of the ARP packet is checked, and if a determination is made that the received ARP packet is an ARP request message, then in operation 406, an ARP pending entry which corresponds to the received ARP packet is created and included in an ARP transaction table, and then in operation 408, the received ARP packet is transmitted to a destination.

If a determination is made in operation 404 that the ARP packet is an ARP response message, then in operation 410, a determination is made as to whether an ARP pending entry which corresponds to the ARP response message exists. If a determination is made that no ARP pending entry which corresponds to the ARP response message exists, the received ARP packet is determined as an unsolicited ARP packet. Accordingly, in operation 412, the packet information storage device 304 creates an ARP pending entry which corresponds to the unsolicited ARP packet and includes the created ARP pending entry in the ARP transaction table, and, in operation 414, adds unsolicited ARP packet information which includes information relating to an input port of the unsolicited ARP packet in the ARP pending entry. Then, in operation 416, the transmitter 306 generates an ARP request packet for requesting a MAC address which corresponds to an IP address of the sender of the unsolicited (or gratuitous) ARP packet, and then broadcasts the generated ARP request packet in operation 418.

Conversely, if a determination is made in operation 410 that the corresponding ARP pending entry exists, then in operation 420, a determination as to whether unsolicited ARP packet information has been included in the corresponding ARP pending entry. If a determination is made that such unsolicited ARP packet information has been included in the corresponding ARP pending entry, then a determination is made that the ARP response message has been received as a response to an ARP request packet which was broadcasted in operation 418, and in this case, in operation 422, the detector 308 determines whether an input port of the ARP response packet is identical to an input port of the unsolicited ARP packet which information is included in the ARP pending entry, and, in operation 424, determines that an abnormal ARP packet has been received (that is, that an ARP spoofing attack has occurred) if a determination is made in operation 422 that the input port of the ARP response packet is not identical to the input port of the unsolicited ARP packet as indicated by the ARP pending entry, and drops the corresponding packet or transmits a warning message to an operator.

If a determination is made in operation 420 that no unsolicited ARP packet information exists in the corresponding ARP pending entry, then in operation 426, the corresponding ARP pending entry is deleted from the ARP transaction table, and the ARP packet received in operation 402 is transmitted to a destination in operation 428.

One or more exemplary embodiments may include non-transitory and/or transitory computer-readable record media which store a program for executing the methods described above by using a computer. The computer-readable record media may store program codes, local data files, local data structures, or combinations thereof. The computer-readable record media may be those specially designed and constructed for the purposes of the exemplary embodiments described above, or they may be of the kind well known to those of ordinary skill in the computer software arts. Examples of non-transitory computer readable media include magnetic media, such as hard disks, floppy disks, and magnetic tapes, optical recording media, such as compact disk-read-only memory (CD-ROM) and digital versatile disk (DVD), magneto-optical media such as floppy disks, and hardware devices that are specially configured to store and perform program instructions, such as read-only memory (ROM), random access memory (RAM), flash memory, and the like. Examples of program codes include both machine codes, as produced, for example, by a compiler, and higher-level language codes that may be executed by a computer by using an interpreter.

It will be apparent to those skilled in the art that various modifications can be made to the above-described exemplary embodiments without departing from the spirit or scope of the present disclosure. Thus, it is intended that the present disclosure covers all such modifications, provided that they fall within the scope of the appended claims and their equivalents.

What is claimed is:

1. An Address Resolution Protocol (ARP) spoofing attack detection system, comprising:
    a receiver which receives a first ARP packet, and which determines whether the received first ARP packet is an unsolicited ARP packet;
    a transmitter which creates, in response to the received first ARP packet being determined as an unsolicited ARP packet, an ARP request packet which corresponds to the unsolicited ARP packet, and which broadcasts the created ARP request packet;
    a detector which determines, in response to an ARP response packet which corresponds to the broadcasted ARP request packet being received, whether an input port of the received ARP response packet is identical to an input port of the unsolicited ARP packet, and which determines that an ARP spoofing attack has occurred in response to the input port of the received ARP response packet being determined as not identical to the input port of the unsolicited ARP packet; and
    a packet information storage device which creates, in response to the received first ARP packet being determined as an unsolicited ARP packet, a first ARP pending entry which corresponds to the unsolicited ARP packet and includes the created first ARP pending entry in an ARP transaction table, and which includes unsolicited ARP packet information which includes information relating to the input port of the unsolicited ARP packet in the first ARP pending entry,
    wherein the detector determines whether unsolicited ARP packet information has been included in a second ARP pending entry which corresponds to the received ARP response packet and which second ARP pending entry is included in the ARP transaction table, and determines whether the input port of the received ARP response packet is identical to the input port of the unsolicited ARP packet included in the second ARP pending entry, in response to unsolicited ARP packet information having been included in the first ARP pending entry which corresponds to the received ARP response packet and which is stored in the ARP transaction table.

2. The system of claim 1, wherein the created ARP request packet includes information relating to a request for a Media Access Control (MAC) address which corresponds to an Internet Protocol (IP) address of the unsolicited ARP packet.

3. The system of claim 1, wherein the receiver determines the received first ARP packet as an unsolicited ARP packet in response to the received first ARP packet including an ARP response message and no ARP pending entry corresponding to the included ARP response message exists in the ARP transaction table.

4. The system of claim 1, wherein the detector deletes a second ARP pending entry which corresponds to the ARP response packet from the ARP transaction table in response to no information relating to the input port of the unsolicited ARP packet existing in the second ARP pending entry, and transmits the received first ARP packet to a destination.

5. An Address Resolution Protocol (ARP) spoofing attack detection method which is performable by using an ARP spoofing attack detection system, comprising:
    receiving a first ARP packet, and determining whether the received first ARP packet is an unsolicited ARP packet;
    creating, in response to the received first ARP packet being determined as an unsolicited ARP packet, a first ARP pending entry which corresponds to the unsolicited ARP packet and including the created first ARP pending entry in an ARP transaction table, and including unsolicited ARP packet information which includes information relating to the input port of the unsolicited ARP packet in the first ARP pending entry, prior to the creating an ARP request packet;
    creating, in response to the received first ARP packet being determined as an unsolicited ARP packet, the ARP request packet which corresponds to the unsolicited ARP packet, and broadcasting the created ARP request packet;
    receiving an ARP response packet which corresponds to the broadcasted ARP request packet; and
    determining whether an input port of the received ARP response packet is identical to an input port of the unsolicited ARP packet, and determining that an ARP spoofing attack has occurred in response to the input port of the ARP response packet being determined as not identical to the input port of the unsolicited ARP packet,
    wherein the determining whether an input port of the received ARP response packet is identical to an input port of the unsolicited ARP packet and determining that an ARP spoofing attack has occurred further comprises:
    searching in the ARP transaction table for a fourth ARP pending entry which corresponds to the received ARP response packet;
    determining whether unsolicited ARP packet information exists in the fourth ARP pending entry which is found as a result of the searching; and
    determining whether the input port of the received ARP response packet is identical to the input port of the unsolicited ARP packet, in response to information relating to the input port of the unsolicited ARP packet existing in the fourth ARP pending entry.

6. The method of claim 5, wherein the created ARP request packet includes information relating to a request for a Media Access Control (MAC) address which corresponds to an Internet Protocol (IP) address of the unsolicited ARP packet.

7. The method of claim 5, wherein the receiving the first ARP packet and determining whether the received first ARP packet is an unsolicited ARP packet further comprises:
    determining a type of the received first ARP packet; and
    determining, in response to the type of the received first ARP packet being determined as an ARP response message type, whether a second ARP pending entry which corresponds to an ARP response message which is included in the received first ARP packet exists in the ARP transaction table,
    wherein in response to a determination being made that no ARP pending entry which corresponds to the ARP response message exists in the ARP transaction table, the received first ARP packet is determined as an unsolicited ARP packet.

8. The method of claim 7, wherein the ARP spoofing attack detection system creates, in response to the type of the received first ARP packet being determined as an ARP request message type, a third ARP pending entry which corresponds to an ARP request message which is included in the received first ARP packet, and includes the created third ARP pending entry in the ARP transaction table.

9. The method of claim 5, further comprising deleting the fourth ARP pending entry from the ARP transaction table in response to no information relating to the input port of the unsolicited ARP packet existing in the fourth ARP pending entry, and transmitting the received first ARP packet to a destination.

10. A non-transitory computer readable medium having recorded thereon a program executable by a computer for performing an Address Resolution Protocol (ARP) spoofing attack detection method by using an ARP spoofing attack detection system, the method comprising:
   causing the system to receive a first ARP packet, and causing the system to determine whether the received first ARP packet is an unsolicited ARP packet;
   causing the system to create, in response to the received first ARP packet being determined as an unsolicited ARP packet, a first ARP pending entry which corresponds to the unsolicited ARP packet and causing the system to include the created first ARP pending entry in an ARP transaction table, and causing the system to include unsolicited ARP packet information which includes information relating to the input port of the unsolicited ARP packet in the first ARP pending entry, prior to causing the system to create an ARP request packet;
   causing the system to create, in response to the received first ARP packet being determined as an unsolicited ARP packet, the ARP request packet which corresponds to the unsolicited ARP packet, and causing the system to broadcast the created ARP request packet;
   causing the system to receive an ARP response packet which corresponds to the broadcasted ARP request packet; and
   causing the system to determine whether an input port of the received ARP response packet is identical to an input port of the unsolicited ARP packet, and causing the system to determine that an ARP spoofing attack has occurred in response to the input port of the ARP response packet being determined as not identical to the input port of the unsolicited ARP packet,
   wherein the causing the system to determine whether an input port of the received ARP response packet is identical to an input port of the unsolicited ARP packet and causing the system to determine that an ARP spoofing attack has occurred further comprises:
      causing the system to search in the ARP transaction table for a fourth ARP pending entry which corresponds to the received ARP response packet;
      causing the system to determine whether unsolicited ARP packet information exists in the fourth ARP pending entry which is found as a result of the search; and
      causing the system to determine whether the input port of the received ARP response packet is identical to the input port of the unsolicited ARP packet, in response to information relating to the input port of the unsolicited ARP packet existing in the fourth ARP pending entry.

11. The non-transitory computer readable medium of claim 10, wherein the created ARP request packet includes information relating to a request for a Media Access Control (MAC) address which corresponds to an Internet Protocol (IP) address of the unsolicited ARP packet.

12. The non-transitory computer readable medium of claim 10, wherein the causing the system to receive the first ARP packet and causing the system to determine whether the received first ARP packet is an unsolicited ARP packet further comprises:
   causing the system to determine a type of the received first ARP packet; and
   causing the system to determine, in response to the type of the received first ARP packet being determined as an ARP response message type, whether a second ARP pending entry which corresponds to an ARP response message which is included in the received first ARP packet exists in the ARP transaction table,
   wherein in response to a determination being made that no ARP pending entry which corresponds to the ARP response message exists in the ARP transaction table, the received first ARP packet is determined as an unsolicited ARP packet.

13. The non-transitory computer readable medium of claim 12, wherein the method further comprises causing the system to create, in response to the type of the received first ARP packet being determined as an ARP request message type, a third ARP pending entry which corresponds to an ARP request message which is included in the received first ARP packet, and causing the system to include the created third ARP pending entry in the ARP transaction table.

14. The non-transitory computer readable medium of claim 10, wherein the method further comprises causing the system to delete the fourth ARP pending entry from the ARP transaction table in response to no information relating to the input port of the unsolicited ARP packet existing in the fourth ARP pending entry, and causing the system to transmit the received first ARP packet to a destination.

\* \* \* \* \*